W. F. & O. P. RESLER.
SWEEP RAKE PUSH.
APPLICATION FILED FEB. 20, 1912.
1,127,681.
Patented Feb. 9, 1915.
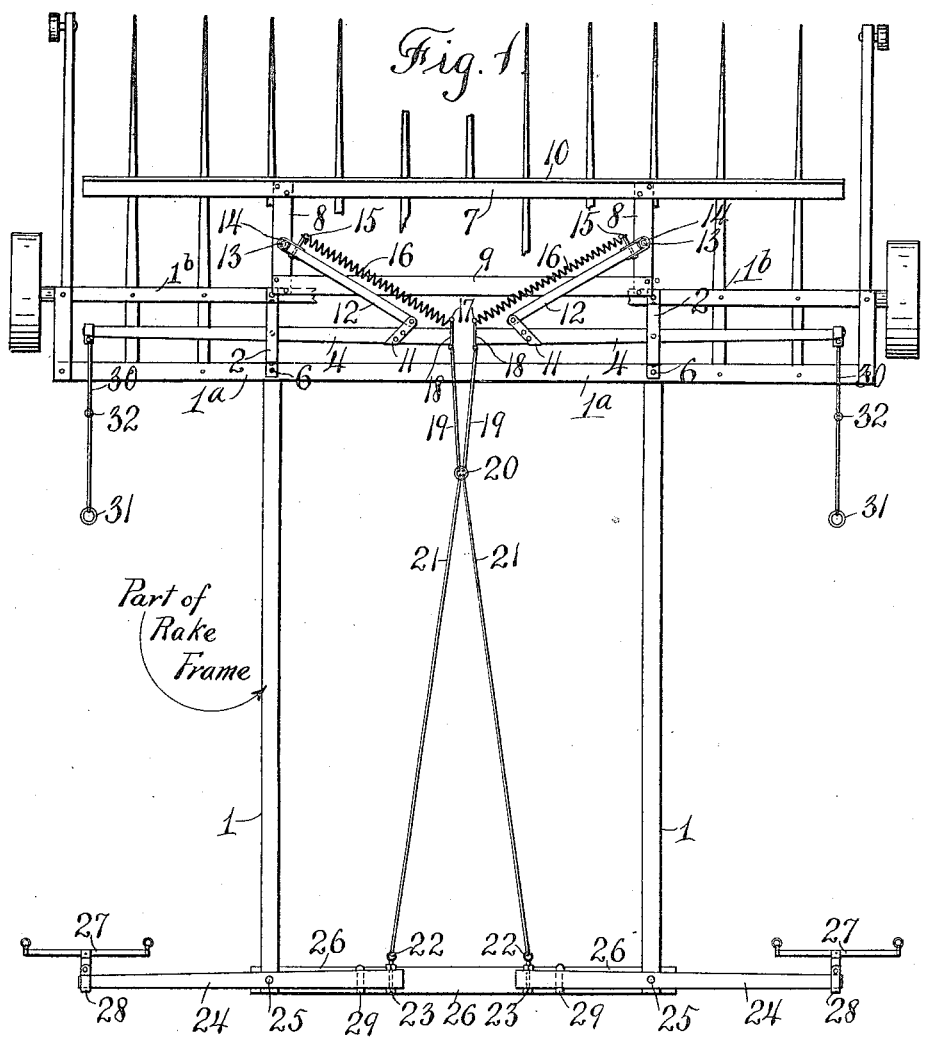
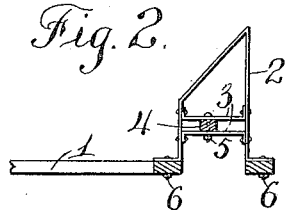
WITNESSES
W. K. McArdlis.
Emma Hildenbrand
INVENTORS
W. Floyd Resler.
O. Perry Resler.
By H. W. Stackpole their Attorney

UNITED STATES PATENT OFFICE.

WILLIAM FLOYD RESLER AND OLIVER PERRY RESLER, OF HENDLEY, NEBRASKA.

SWEEP-RAKE PUSH.

1,127,681. Specification of Letters Patent. Patented Feb. 9, 1915.

Application filed February 20, 1912. Serial No. 678,881.

*To all whom it may concern:*

Be it known that we, WILLIAM FLOYD RESLER and OLIVER PERRY RESLER, citizens of the United States, residing at Hendley, in the county of Furnas and State of Nebraska, have invented certain new and useful Improvements in Sweep-Rake Pushes, of which the following is a specification.

Our invention relates to that class of rakes in which the draft animals are located behind the rake and which employ a push bar or sweep to clear the rake teeth of collected material when a sufficient amount has been gathered and it is desired to withdraw the rake from under the collected material.

The object of our invention is to produce a push bar or sweep of improved construction and efficiency.

Figure 1 is a plan view of a push bar or sweep constructed in accord with our invention, together with portions of a rake to which it is attached. Fig. 2 is a detail of an attaching bracket.

1, 1, is a pair of poles or tongues, $1^a$ a rear transverse rake beam and $1^b$ a forward transverse rake beam, the construction of the rake being immaterial to the present invention with the exception that the teeth of the rake point in the same direction as the draft animals' heads and the draft animals are located behind the rake and travel forward with the rake when the material is being collected and back with the rake when the rake is to be withdrawn from the material.

2, 2, are brackets of convenient shape, each bracket supporting, between a pair of horizontal braces, a push lever 4, pivotally secured near its middle point to the braces by fastenings 5, the brackets being secured by fastenings 6 to the rear transverse rake beam and the forward transverse rake beam.

7 is a transverse push bar of convenient construction adapted to brace or support a construction 10 to prevent material from following the rake teeth as they are withdrawn. The transverse bar forms the front side of a rectangular frame having side pieces 8 and rear piece 9 all braced and bolted together. The transverse bar is surmounted by a framework 10, of suitable design, adapted to serve as a barrier.

Near the inner end of each of the push levers 4 is a diagonally attached bracket or strap iron 11 receiving one end of a push arm 12, the other end of the push arm being secured at 13 to one of the side pieces 8 by means of a clevis or other pivotal device 14.

To a stud or hook 15 near the forward end of each of the push arms 12 is secured one end of a spring 16 the other end of the spring being secured to the forward end 17 of a double link or hook 18 located at the inner end of the adjacent push lever 4. To the rear end of each of said links or hooks 18 is connected a rod 19 the two rods extending rearwardly and engaging a single ring 20 from which extends rearwardly two rods 21 each leading to an eye bolt 22 secured to the inner end 23 of a rear or pull lever 24 pivoted at 25 to the rear end of one of the poles or tongues 1, the tongues being braced by a transverse beam 26, and each of the rear or pull levers 24 carrying at its outer end a strap or pivot connection 28 to which is attached a swingletree 27. The harness traces of the draft animals may be attached to the swingletree and the pole straps to the ring 31.

29 are stops mounted on the connecting beam 26 each stop being preferably in the form of a J shaped iron, the upturned end of which serves to limit the backward movement of the inner end of the abutting pull rod.

To the outer end of each of the forward or push levers 4 is attached a rod connection 30 having a harness attaching ring 31 at its end and formed in two sections connected by links 32.

It will be readily seen that the draft animals pull the machine forward by means of traces attached to the swingletrees 27 which by connections 28 are secured to pull bars 24, which in turn are, by pivots 25, attached to the tongues or reaches 1. The inner ends of pull bars 24 are prevented from backward movement by back stops 29.

It is obvious that, when the rake has collected a supply of material in the usual manner, a backward movement of the animals will pull on the ends of the forward or push levers 4 and pull on the inner ends of the rear or pull levers 24. Thus the movement of the rake and all parts of the sweep, excepting the frames and diagonally inclined push arms 12, is reversed. The push arms of the forward or push levers, acting as a pair of lazy-tongs, hold the transverse push bar 7 and surmounting framework 10 against the collected material.

As soon as the animals cease their backward movement the springs 16 return the frame 10 to normal position, the duty of the springs being principally to assist in moving the frame forward and taking up slack or lost motion and the ring 20 as an equalizer or synchronizer of the movements of the rods 19 and 21. By this arrangement the animals when the collecting process is going on hold the sweep frame back against the rake frame and are assisted in the discharging process by the action of the springs, the springs thereby not adding to the power required to move the rake, but assisting in the movement of the rake away from the load.

The within described mechanism applies only to wheel rakes and no claim is made for its application to drag rakes.

Having thus described our invention the following is what we claim as new therein and desire to secure by Letters Patent:

1. The combination with a push rake frame, of a push bar slidable thereon, draft animal operated means for actuating said push bar, and tension devices operatively connected with said bar and with said means and assisting said push bar to discharge the load movements.

2. The combination with a push rake frame, of a push bar slidable thereon, draft levers pivoted on the frame and connected for simultaneous movement, a rod connecting the bar with one of said levers and regulating the relative movement of the bar and lever, and a tension device assisting said bar to discharge the load.

3. The combination with a wheeled frame, of a push rake including a supporting frame, a push bar slidable thereon, and means automatically operated upon backward movement of said wheeled frame for actuating said push bar, said means including a pair of draft trees attached to said frame, a pair of levers pivoted on said frame and connected to said bar, connecting rods for said levers and draft trees, and a spring for each of said levers assisting said bar to discharge the load.

In witness whereof, we have hereunto affixed our signatures in the presence of two subscribing witnesses.

W. FLOYD RESLER
O. PERRY RESLER

Witnesses:
G. McKINNEY,
EDWIN E. PERKINS.

Copies of this patent may be obtained for five cents each, by addressing the "Commissioner of Patents, Washington, D. C."